United States Patent [19]

Chinnaswamy et al.

[11] Patent Number: 5,008,886
[45] Date of Patent: Apr. 16, 1991

[54] READ-MODIFY-WRITE OPERATION

[75] Inventors: Kumar Chinnaswamy, Milford; Michael A. Gagliardo, Shrewsbury; Paul M. Goodwin, Framingham; John J. Lynch, Wayland; James E. Tessari, Arlington, all of Mass.

[73] Assignee: Digital Equipment Corporation, Maynard, Mass.

[21] Appl. No.: 303,621

[22] Filed: Jan. 27, 1989

[51] Int. Cl.⁵ ............................................. G06F 11/10
[52] U.S. Cl. ................................................ 371/40.2
[58] Field of Search .................. 371/40.1, 40.2, 40.3, 371/40.4, 38.1, 39.1

[56] References Cited

U.S. PATENT DOCUMENTS

| 4,371,949 | 2/1983 | Chu et al. ............................... | 364/900 |
| 4,464,752 | 8/1984 | Schroeder et al. ................. | 371/40.1 |
| 4,710,934 | 12/1987 | Traynor ................................ | 371/40.1 |
| 4,761,785 | 8/1988 | Clark et al. .......................... | 371/2.2 |
| 4,884,271 | 11/1989 | Concha et al. ...................... | 371/40.2 |

Primary Examiner—Charles E. Atkinson
Attorney, Agent, or Firm—Neuman, Williams, Anderson & Olson

[57] ABSTRACT

A method and apparatus for a read-modify-write operation in a digital computer memory system which reduces memory data path buffer storage requirements with a procedure which includes latching new write data and associated mask fields into a data output buffer and then merging read data with the new data in the output buffer according to the latched mask fields.

16 Claims, 3 Drawing Sheets

READ-MODIFY-WRITE OPERATION

FIELD OF THE INVENTION

The present invention relates to data modification for digital computer memory systems, and more particularly to a method and apparatus for buffering read and write operations in a read-modify-write memory cycle.

BACKGROUND OF THE INVENTION

In a digital computer system which includes data written into memory as part of a read-modify-write operation, the data typically includes an error correction code (ECC) which extends over a number of consecutive bytes of data. When read data from the memory is to be modified by new data and then written into a selected address of the memory and the read data to be modified has a length less than the number of bytes necessary to generate the associated check bits for the error correction code (ECC), it is then necessary to read the entire selected address before merging the new data with the read data in order to properly generate new ECC check bits for the modified data which is rewritten. For instance, in the typical read-modify-write memory cycle, if four consecutive bytes of read data are necessary to generate corresponding check bits for the error correction code (ECC), and if only one byte of data of four consecutive bytes of read data is to be modified, then it is nevertheless necessary to read the entire four bytes of data in order to generate check bits for the modified data.

The procedure generally used for read-modify-write operations as described above has involved a read buffer for storing the entire contents of the memory address selected for modification with new data and a write buffer for storing the modified data for the selected memory address until the modified data could be rewritten. In addition, when two write commands were required, there would be a separate input data buffer for each command. The large amount of buffer storage required in the generally used read-modify-write data path is undesirable.

SUMMARY OF THE INVENTION

The present invention reduces the buffer storage required for merging new data with read data in a read-modify-write data path of a memory storage system by first latching the new data with associated mask fields into a data output buffer, and then merging read data with the new data in the output buffer according to the latched mask fields. The mask fields comprise bits of data which dictate which portion of the read data is to be replaced with new data, as well known in the art. The appropriate check bits for the ECC are generated and added to the modified data in the data output buffer to produce a new data output which is released from the data output buffer into the memory at the selected address.

DESCRIPTION OF THE PREFERRED EMBODIMENT

Figure 1:
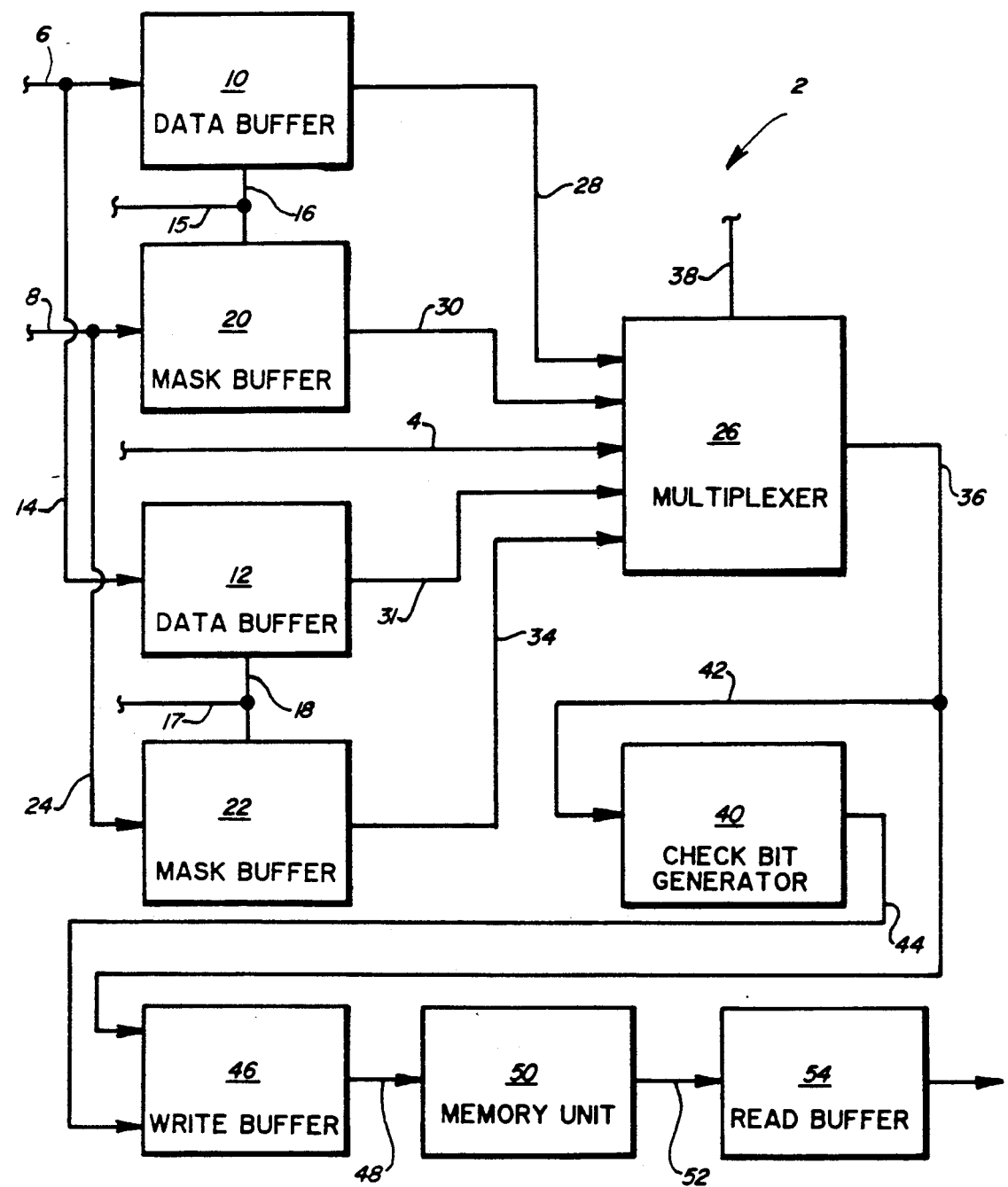
FIG. 1 is a block diagram of a typical prior art read-modify-write memory data path arrangement.

Referring to the drawings, wherein the same reference characters designate like or corresponding parts throughout the views, FIG. 1 shows a general block diagram of a typical read-modify-write system 2 for a memory system according to the prior art. The read-modify-write system 2 includes a read data input line 4 which receives read memory data from the computer memory system (not shown). The system 2 also includes a new data input line 6 for receiving new data from an associated computer system control unit (SCU, not shown) for modifying the read memory data on the line 4. The system 2 additionally includes a mask data line 8, for receiving mask information from the SCU to dictate the portion of the memory read data on the line 4 to be modified with the new data on the line 6. The new input data on the line 6 and the mask data on the line 8 are synchronously transmitted from the SCU in serial form. The new data on the line 6 is typically in the format of consecutive sequential 16 byte writes.

In FIG. 1, provisions are shown for latching two consecutive 16 byte writes of the new data on the line 6 with a 16 byte first new data buffer 10, and a 16 byte second new data buffer 12. The first new data buffer 10 receives new data via the line 6 and the second new data buffer 12 receives the new data on the line 6 via a second data buffer input line 14. The first new data buffer 10 and the second new data buffer 12 are alternatively and consecutively latched with a first latch signal on a first latch line 16 and a second latch signal on a second latch line 18 fed from a timing source (not shown) via timing lines 15 and 17 respectively from the SCU. The timing of the first and second latch signals on the lines 16 and 18 respectively is selected so that alternate consecutive 16 byte writes on the line 6 are fed to the first new data buffer 10 and the second new data buffer 12, respectively.

Each 16 byte write on the line 6 directed to either the first new data buffer 10 or the second new data buffer 12 has an associated mask field simultaneously transmitted on the line 8 from the SCU. The mask fields are typically 16 bits for each 16 byte write of new data on the line 6. A 16 bit first mask buffer 20 is latched by the first latch signal on the first latch line 16 so that the first mask buffer 20 latches a 16 bit mask field on the line 8 corresponding to the 16 bytes of new input data simultaneously latched by the first input buffer 10. A 16 bit second mask buffer 22 is latched by the second latch signal on the second latch line 18 so that the second mask buffer 22 latches a 16 bit mask field on the line 8 via a second mask buffer input line 24 corresponding to the 16 bytes of new input data simultaneously latched by the second input buffer 12. When the first data buffer 10 and the first mask buffer 20 are synchronously unlatched, their latched data is fed to a merging multiplexer 26 via a first data buffer output line 28 and a first mask buffer output line 30, respectively. The merging multiplexer 26 serves to merge the unlatched new data on the line 28 with the read data fed to the multiplexer 26 on the line 4 according to the mask data simultaneously unlatched on the line 30.

Likewise, when the second data buffer 12 and the second mask buffer 22 are synchronously unlatched, their latched data is fed to the merging multiplexer 26 via a second data buffer output line 32 and a second mask buffer output line 34, respectively. Thus, as the second data buffer 12 and the second mask buffer 22 unlatch their outputs, the multiplexer 26 modifies the read data input from the line 4 with the new data input from the line 32 as dictated by the mask data from the line 34. The multiplexer 26 then selectively feeds its fully merged data output on a multiplexer output line 36 in response to a select signal supplied by the SCU timing source on a multiplexer select line 38.

The read data on line 4 modified as described above is typically modified in 64 byte segments, so that the multiplexer 26 provides its fully merged output on the line 36 in corresponding 64 byte segments. This is done so that the fully merged data so provided can be used to generate a new set of 14 corresponding check bits according to the ECC code used in an ECC check bit generator 40, driven by the fully merged data output on the line 36 via a check bit generator input line 42. The check bit generator 40 generates a 14 bit ECC check bit data output on a check bit generator output line 44 which is latched with the corresponding fully merged data output on the line 36 in a 64 bit write data buffer 46. When the write data buffer 46 is unlatched, it produces a fully merged data output with 14 corresponding ECC check bits on a write buffer output line 48, which is written into a memory unit 50, such as a DRAM array. The corresponding data so written in the memory unit 50 may subsequently be read by feeding the output of the memory unit 50 on a memory unit output line 52 through a 64 byte read buffer 54. The output of the read buffer 54 on a read buffer output line 56 may then be recirculated to the line 4 described above for subsequent data modification and rewriting, if required. Each of the above elements are well known components which may be interconnected in a variety of well known configurations and are shown in block form in FIG. 1 for purposes of representation only, since they do not in themselves constitute part of the present invention.

Figure 2:
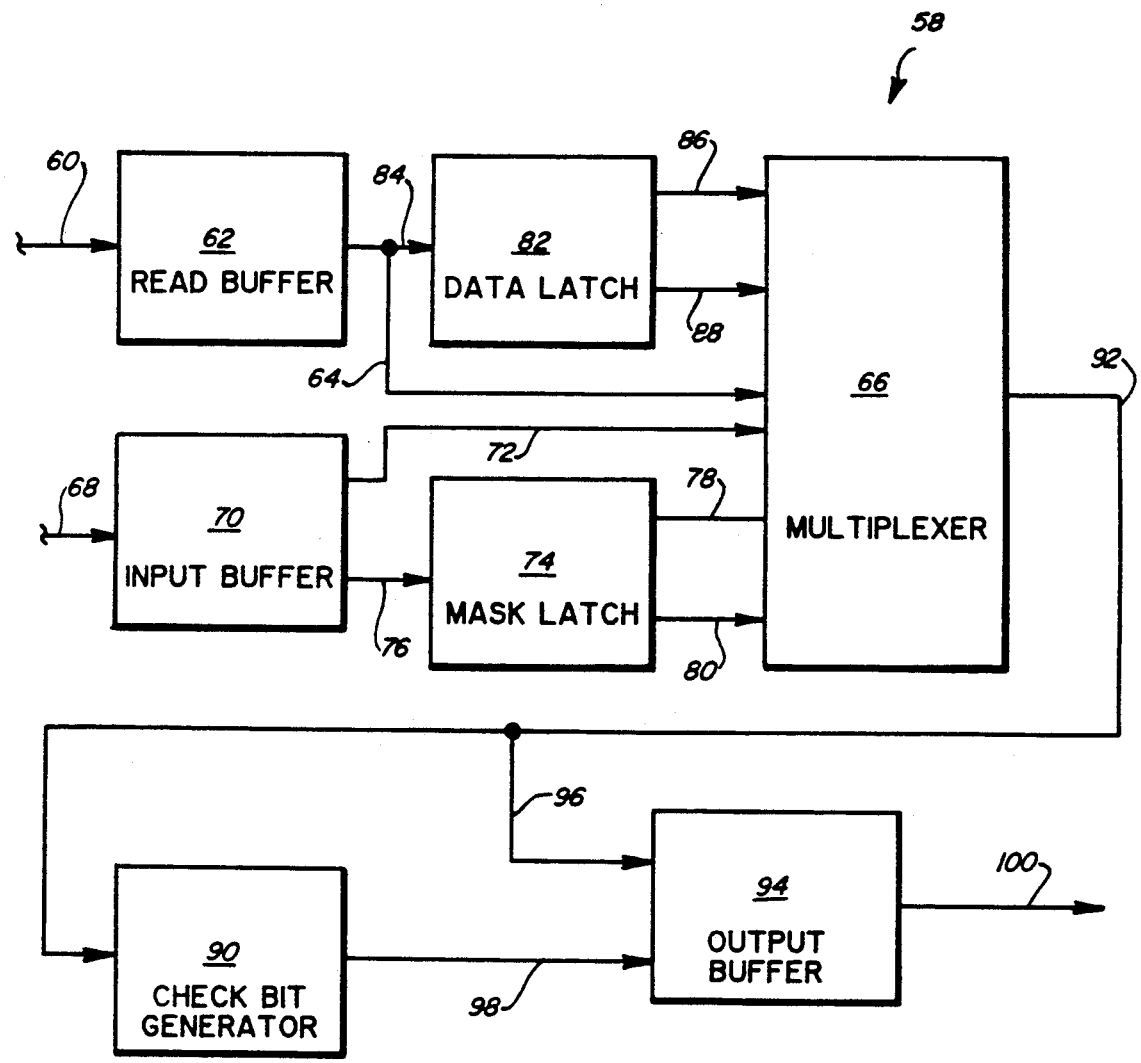
FIG. 2 is a block diagram of a read-modify-write memory data path arrangement according to the present invention.

The present invention reduces the amount of buffer storage required in the memory data path described above. FIG. 2 shows a block diagram of a read-modify-write memory data path system 58 incorporating the present invention. Read data is received from the memory unit data flow path, described herein below, via a read data input line 60. The read data on the line 60 is periodically latched by a read data buffer 62 which latches 64 data bits of the 80 bit read data input segments. Since the 16 corresponding ECC check bits of the 80 bit read data input must be changed after read data is modified, they are not latched. When unlatched, the output of the read data buffer 62 is fed on a read buffer output line 64 either through a merging multiplexer 66 if the read data is not to be modified, or into additional circuitry, as described hereinafter, if the read data is to be modified. The merging multiplexer 66 serves to merge new data input with the read data on the line 64 for the same purpose as the multiplexer 26 in the prior art read-modify-write system 2 described above in connection with FIG. 1.

New data input is received on a new data input line 68. The new data on the line 68 typically has a 78 bit format with 64 data bits and 14 corresponding check bits. The new data input on the line 68 has its 64 data bits arranged in two sequential 32 bit data words, including first and second corresponding 4 bit data masks to dictate which portion of the read data input on the line 60 is to be modified by the new data input on the line 68. The 78 bit segments of the new data on the line 68 are latched by a 78 bit new data and mask buffer 70. When unlatched, the sequential first and second 32 bit data words which have been latched as part of the latched 78 bit new data input in the new data and mask buffer 70 are transferred to the merging multiplexer 66 via a multiplexer input line 72. The first and second 32 bit data words are fed to a 32 bit dual word mask latch 74 via a mask latch line 76, and the dual word mask latch 74 sequentially releases the corresponding first and second data masks as it unlatches into the merging multiplexer 66 via a first mask line 78 and a second mask line 80, respectively. The first and second data masks corresponding to each first and second 32 bit data word fed to the multiplexer 66 on the multiplexer input line 72 dictate to the multiplexer 66 which portions of the read data input signal on the line 60 will be modified as part of the read-modify-write process.

To facilitate modification of the read input data as the new and mask data is sequentially unlatched by the new data and mask buffer 70 and the dual 32 bit word mask latch 74, the read data on the line 64 is fed to a dual 64 bit read data segment latch 82 via a read data latch line 84 which sequentially latches consecutive 64 bit segments of the read data from the line 64. The first and second read data segments latched by the read data latch 82 are sequentially unlatched and fed into the multiplexer 66 via a first read data segment line 86 and a second read data segment line 88. The read data latch 82 is unlatched in synchronization with the new data and mask buffer 70 and the dual word mask latch 74 so that read data is held in the multiplexer 66 while the corresponding new data and mask data is fed to the multiplexer 66 to perform the data merging operation.

The merged 64 bit data segments from the multiplexer 66 are then fed to a check bit generator 90 via a multiplexer output line 92. The check bit generator generates 16 check bits per 64 bit data segment in conformance with the ECC code used. The merged data on the line 92 is also fed to an 80 bit data output buffer 94 via a data buffer input line 96. Simultaneously, the check bit generator 90 feeds its 16 bit check bit output along a check list generator output line 98 into the data output buffer 94. The data output buffer 94 combines the 64 bit merged data segments with their corresponding new 16 ECC check bits to produce corresponding 80 bit write data segments on a data buffer output line 100.

Figure 3:
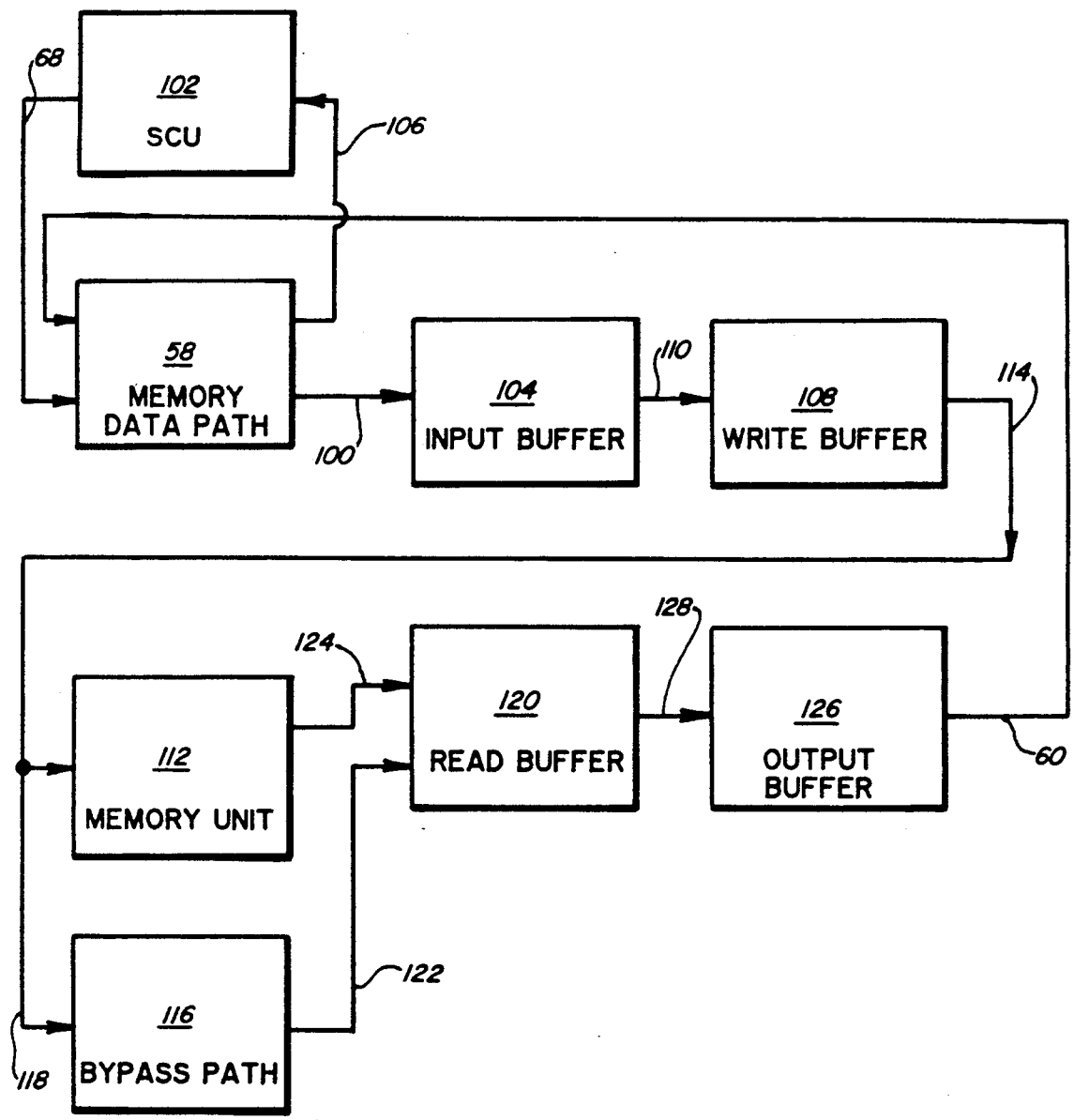
FIG. 3 is a schematic of the preferred embodiment for incorporating the memory data path shown in FIG. 2.

The data merging operation described above is included in a complete read-modify-write memory system as shown in FIG. 3. The memory data path 58 described above has its new data input on the line 68 fed from an associated system control unit (SCU) 102. The output from the memory data path 58 is fed from the line 100 to a 640 bit data input buffer 104, as well as back to the SCU 102 via an SCU input line 106. After the data input buffer 104 latches a full 640 bits of data from the line 100, its output is unlatched and fed to a 640 write data buffer 108 via a write data buffer input line 110. After the write data buffer 108 latches a full 640 bits of data from the line 110, its output is unlatched into a 640 bit memory unit 112 via a write data buffer output line 114. The memory unit 112 stores the data unlatched from the write data buffer 108. When data is intended to bypass the memory unit 112 for direct reading of modified data, the write data buffer output on the line 114 is fed into a bypass path 116 under control of signals from the SCU (not shown) via a bypass path input line 118 and the output of the bypass path 116 feeds a 640 bit read data buffer 120 via a bypass output line 122. After the read data buffer 120 latches a full 640 bits of data from the bypass output line 122, or from the memory unit 114 via a memory unit output line 124, the output of the read data buffer 120 is unlatched and fed into a data output buffer 126 via a read data buffer output line 128. After the data output buffer 126 latches a full 640 bits of data form the line 128, its output is unlatched in 80 bit data segments and fed back to the memory data path 58 via the line 60 to complete the read-modify-write operation as described above in connection with FIG. 2. Of course, the read-modify-write system described above in connection with FIG. 3 is independent of the read-modify-write operation, and it does not contribute to the added buffering needed to support read-modify-write operations. The elements described above are well known components which may be interconnected in a variety of well known configurations and are shown in block form in FIGS. 2 and 3 for purposes of representation only, since they do not in themselves constitute part of the present invention.

Thus, the present invention as described above significantly reduces the amount of buffer storage in the memory data path over prior art systems, while still providing buffering capacity for two write commands. It will be understood that various changes in the details, arrangements and configurations of the parts and assemblies which have been described above in order to explain the nature of the present invention may be made by those skilled in the art within the principle and scope of the present invention as expressed in the appended claims.

What is claimed is:

1. A method of merging read data from a digital computer memory with new input data including mask field bits to modify said read data for rewriting into said memory, comprising the steps of:
   latching a first selected number of data bits from said read data;
   latching a second selected number of data bits from said new input data;
   latching said mask field bits corresponding to said latched new input data bits;
   multiplexing said latched read data bits with said latched new input data bits according to said latched mask field bits to form said first selected number of merged data bits;
   generating a third selected number of check bits with said merged data bits according to an error correction code; and
   combining said merged data bits with said check bits to form modified write data.

2. The method recited in claim 1, wherein said first selected number of merged data bits corresponds to the number of data bits required to generate said third selected number of check bits according to said error correction code.

3. The method recited in claim 2, wherein said second selected number of data bits is less than said first selected number of data bits.

4. The method recited in claim 3, wherein said step of multiplexing comprises replacing said second selected number of said latched read data bits with said second selected number of said latched new data bits according to said corresponding latched mask field bits.

5. For a memory device, a method of merging read data, formatted with an error correction code requiring a first selected number of data bits to generate a second selected number of check bits, with new input data including mask field bits, comprising the steps of:
   latching said first selected number of data bits from said read data;
   latching a third selected number of data bits from said new input data, said third selected number of data bits being less than said first selected member of data bits;
   latching said mask field bits corresponding to said latched new input data bits;
   multiplexing said latched read data bits with said latched new input data bits according to said latched mask field bits to form said first selected number of merged data bits;
   generating said second selected number of check bits with said merged data bits according to said error correction code; and
   combining said merged data bits with said check bits to form modified write data.

6. The method recited in claim 5, wherein said step of multiplexing comprises replacing said third selected number of said latched read data bits with said third selected number of said latched new data bits according to said corresponding latched mask field bits.

7. For a computer system including a read-modify-write operation, a method of merging read data, formatted with an error correction code requiring a first selected number of data bits to generate a second selected number of check bits, with new input data including mask field bits, comprising the steps of:
   latching said first selected number of data bits from said read data;
   latching a third selected number of data bits from said new input data, said third selected number of data bits being less than said first selected number of data bits;
   latching said mask field bits corresponding to said latched new input data bits;
   multiplexing said latched read data bits with said latched new input data bits according to said latched mask field bits to form said first selected number of merged data bits;
   generating said second selected number of check bits with said merged data bits according to said error correction code; and
   combining said merged data bits with said check bits to form modified write data.

8. The method recited in claim 7, wherein said step of multiplexing comprises replacing said third selected number of said latched read data bits with said third selected number of said latched new data bits according to said corresponding latched mask field bits.

9. For a memory device, apparatus for merging read data with new input data including mask field bits, comprising:
   means for latching a first selected number of data bits from said read data;
   means for latching a second selected number of data bits from said new input data;
   means for latching said mask field bits corresponding to said latched new input data bits;
   means for multiplexing said latched read data bits with said latched new input data bits according to said latched mask field bits to form said first selected number of merged data bits;

means for generating a third selected number of check bits with said merged data bits according to an error correction code; and means for combining said merged data bits with said check bits to form modified write data.

10. The apparatus recited in claim 9, wherein said first selected number of data bits corresponds to the number of data bits required to generate said third selected number of checks bits according to said error correction code.

11. The apparatus recited in claim 10, wherein said second selected number of data bits is less than said first selected number of data bits.

12. The apparatus recited in claim 11, wherein said means for multiplexing comprises means for replacing said second selected number of said latched read data bits with said second selected number of said latched new data bits according to said corresponding latched mask field bits.

13. For a memory device, apparatus for merging read data, formatted with an error correction code requiring a first selected number of data bits to generate a second selected number of check bits, with new input data including mask field bits, comprising:

means for latching said first selected number of data bits from said read data;

means for latching a third selected number of data bits from said new input data, said third selected number of data bits being less than said first selected number of data bits;

means for latching said mask field bits corresponding to said latched new input data bits;

means for multiplexing said latched read data bits with said latched new input data bits according to said latched mask field bits to form said first selected number of merged data bits;

means for generating said second selected number of check bits with said merged data bits according to said error corrections code; and means for combining said merged data with said check bits to form modified write data.

14. The apparatus recited in claim 13, wherein said means for multiplexing comprises means for replacing said third selected number of said latched read data bits with said third selected number of said latched new data bits according to said corresponding latched mask field bits.

15. A computer system including a read-modify-write operation for merging read data, formatted with an error correction code requiring a first selected number of data bits to generate a second selected number of check bits, with new input data including mask field bits, comprising:

means for latching said first selected number of data bits from said read data;

means for latching a third selected number of data bits from said new input data less than said first selected number;

means for latching said mask field bits corresponding to said latched new input data bits;

means for multiplexing said latched read data bits with said latched new input data bits according to said latched mask field bits to form said first selected number of merged data bits;

means for generating said second selected number of check bits with said merged data bits according to said error correction code; and means for combining said merged data bits with said check bits to form modified write data.

16. The system recited in claim 15, wherein said means for multiplexing comprises means for replacing said third selected number of said latched read data bits with said third selected number of said latched new data bits according to said corresponding latched mask field bits.

* * * * *